No. 786,093. PATENTED APR. 25, 1905.
N. E. CLARK.
METHOD OF MANUFACTURING EXPANDED METAL.
APPLICATION FILED DEC. 23, 1904.

2 SHEETS—SHEET 1.

Witnesses
Chas A Peard.
R. H. Styln

Inventor
Norris Elmore Clark.
By His Attorneys
Bartlett, Brownell & Mitchell

No. 788,093. PATENTED APR. 25, 1905.
N. E. CLARK.
METHOD OF MANUFACTURING EXPANDED METAL.
APPLICATION FILED DEC. 23, 1904.
2 SHEETS—SHEET 2.
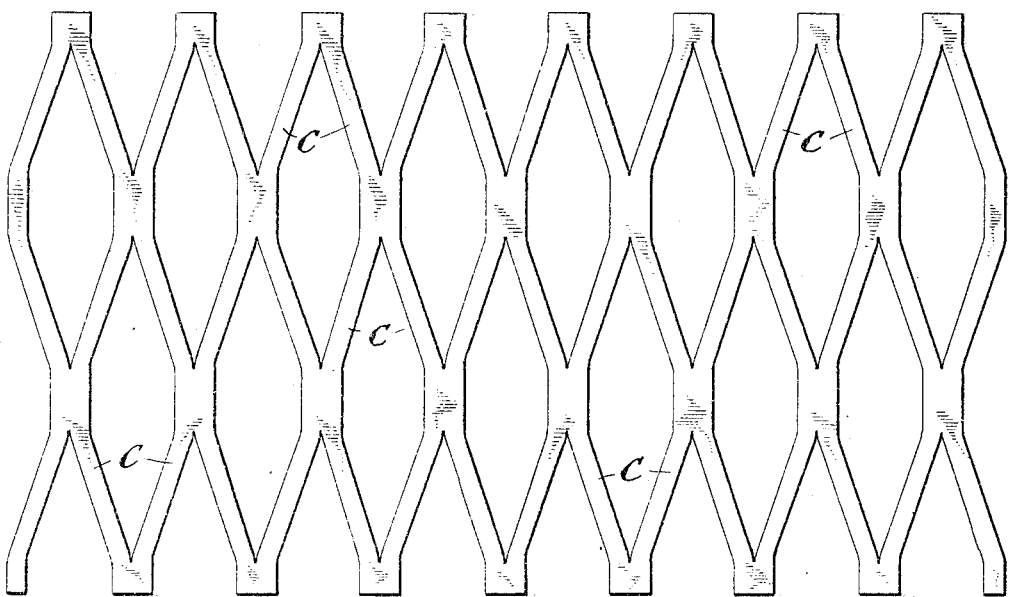
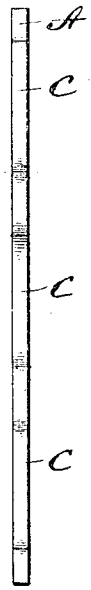
Witnesses
Inventor
Norris Elmore Clark.

No. 788,093.

Patented April 25, 1905.

UNITED STATES PATENT OFFICE.

NORRIS ELMORE CLARK, OF PLAINVILLE, CONNECTICUT.

METHOD OF MANUFACTURING EXPANDED METAL.

SPECIFICATION forming part of Letters Patent No. 788,093, dated April 25, 1905.

Application filed December 23, 1904. Serial No. 238,068.

*To all whom it may concern:*

Be it known that I, NORRIS ELMORE CLARK, a citizen of the United States, residing at Plainville, Hartford county, State of Connecticut, have invented certain new and useful Improvements in Methods of Manufacturing Expanded Metal, of which the following is a full, clear, and exact description.

My invention relates to a new and improved method of forming "expanded metal," so called, which may be used for any desirable purpose—for example, metal lathing.

The main object of my invention is to cheapen the cost of manufacture and impart to the finished product superior qualities, as will be obvious to a mechanic skilled in the art from an understanding of the new method described.

Figure 1:
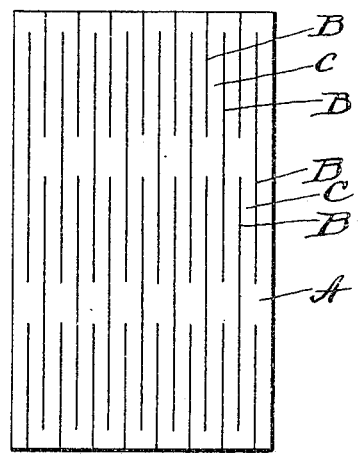
Figure 2:
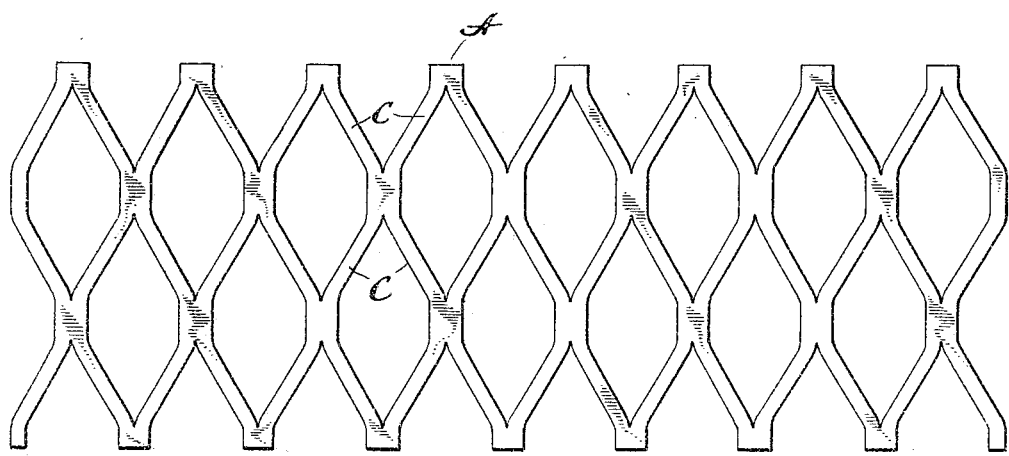

Figure 1 is a plan view of a sheet of metal after it has been subjected to the first step of the process. Fig. 2 is a plan view of the same sheet of metal shown in Fig. 1 after it has been subjected to the second step of the process. Fig. 3 is a plan view of the finished article after it has been subjected to the final step of the process. Fig. 4 is an edge view of the sheet shown in Fig. 1. Fig. 5 is an edge view of the finished product shown in Fig. 3.

My improved method consists in taking a relatively thick strip of metal of suitable width and first slitting the same, preferably so that said slits will break joints or overlap one another. The original sheet of metal employed is indicated in Fig. 1 by the reference-letter A. The slits therein are indicated at B. Between the slits are shown strands or webs C C. The slits may be formed in any desired manner or arrangement and by any suitable tools. After the slits are formed the metal is expanded laterally, for example, so that it will assume the appearance shown in Fig. 2. The final step in the process comprises rolling the semiformed product of Fig. 2 longitudinally, so as to reduce the thickness of the same and so as to stretch or elongate it, for example, to the relatively greater length indicated in Fig. 3. This rolling and stretching of the web simultaneously smoothes out the surface, widens the strands or webs C C, and adds substantial stiffness and rigidity to the product.

For the purpose merely of illustration I have indicated conventionally in Figs. 3 and 4 the original thickness and the relatively reduced thickness of the sheet of metal. By my invention the thickness of the finished product may be of a gage so thin that it would be practically impossible to start originally with a sheet of metal of said gage and slit and expand it without danger of tearing the strands at the point of junction or buckling the strands. Furthermore, if the final rolling process were not resorted to the finished product would lack a uniformly smooth appearance.

In carrying out my process the machine employed for slitting the metal does not have to be as cumbersome and large as would be required were it necessary to make the slits of a length which would correspond substantially to the length of the final openings. For example, it will be seen that the length of the slits B B in Fig. 1 may be considerably less than the length of the openings in the final product in Fig. 3. Of course the length of the sheet of metal is somewhat foreshortened incidental to the second step; but the final step may stretch the metal so that the length of said openings will correspond to or be greater than the length of the slits of Fig. 1. The first and second steps might be carried out on the same machine and practically simultaneously, except that of course the expanding would necessarily follow the slitting.

It should not be understood that it is possible to evade the invention by merely subjecting the finished product of Fig. 3 to a further manipulation—for example, a mere supplemental expanding of the metal after the rolling process—because the substantial advantages of my improvement would have been already attained and incorporated prior to the said supplemental manipulation. It is, however, essential that the rolling and incidental smoothing, stretching, and widening of the individual strands should follow the initial slitting and expanding, since by this order substantial advantages are attained.

What I claim is—

1. A new and improved method for manufacturing expanded metal which comprises, first, slitting the metal to form strands, then opening said slits to separate said strands, and finally rolling the thus-formed product to smooth the same.

2. A new and improved method of manufacturing expanded metal which comprises, first, slitting the metal to form strands, then opening said slits to separate said strands, and finally rolling the thus-formed product to elongate and stiffen the strands.

Signed at Plainville, Connecticut, this 21st day of December, 1904.

NORRIS ELMORE CLARK.

Witnesses:
A. V. BROCK,
D. G. CLARK.